United States Patent
Coombs et al.

[15] 3,666,180
[45] May 30, 1972

[54] DENTAL LIGHT

[72] Inventors: Peter M. Coombs, Newton, N.H.; Harold L. Hough, Beverly, Mass.

[73] Assignee: Sylvania Electric Products, Inc.

[22] Filed: Sept. 2, 1970

[21] Appl. No.: 68,847

[52] U.S. Cl. ..........................240/41.15, 240/41.3
[51] Int. Cl. ..........................A61b 1/06, F21v 13/04
[58] Field of Search ............240/41.15, 41.3, 1.4, 2 M, 240/2.18; 350/96 R; 128/23

[56] References Cited

UNITED STATES PATENTS

| | | | |
|---|---|---|---|
| 3,446,952 | 5/1969 | Sitter | 240/1.4 |
| 1,603,157 | 10/1926 | Sheaffer | 240/41.3 |
| 3,244,894 | 4/1966 | Steele | 350/96 B |
| 2,154,842 | 4/1939 | Glenn | 240/41.3 |
| 3,051,035 | 5/1962 | Root | 350/96 B |
| 3,216,477 | 11/1965 | Devine | 350/96 B |

Primary Examiner—Richard C. Queisser
Assistant Examiner—C. E. Snee, III
Attorney—Norman J. O'Malley, Laurence Burns and Joseph C. Ryan

[57] ABSTRACT

A dental illuminator projecting a sharply defined beam of light and having an optical clad glass rod for providing in addition a supplementary small spot of light for illuminating cavities and the like. The glass rod is placed with one end near and facing said bulb and perpendicular to the axis of the filament to receive light directly therefrom. The rod extends outside said fixture, and is connected to a flexible fiber optic conduit.

6 Claims, 2 Drawing Figures

PATENTED MAY 30 1972　　　　　　　　　　　　　　3,666,180

PETER M. COOMBS
HAROLD L. HOUGH
INVENTORS

BY Lawrence Burn
ATTORNEY

DENTAL LIGHT

BACKGROUND OF THE INVENTION

1. Field of Invention

This invention relates to fixtures which are suitable for dental illumination, and particularly to gated fixtures which project a sharply defined pattern for general illumination and a smaller spot for intra-cavital illumination and the like.

2. Brief Summary Of Prior Art

The general illumination is obtained from a sharply defined, usually rectangular beam, and the spot lighting by optical fiber conduits. Previous devices of this kind have used an optical fiber conduit at or near a light gate which sets the beam pattern, the conduit being attached to the gate. This introduces manufacturing problems in fixing the conduit to the gate, and introduces chromatic aberration into the main sharply defined beam because of light rays being reflected from the conduit. Moreover, the light from the conduit is of lower intensity than is desirable.

BRIEF SUMMARY OF INVENTION

We have discovered that the disadvantages set forth above can be overcome by placing the receiving end of an optical clad glass rod close to the light source, instead of at the gate. In one example, we have placed the end of such a glass rod about one-eighth inch from the wall of the bulb of a light source. The receiving end of the rod can be perpendicular to and in line with the filament of the source.

The rod can be held in position by a set-screw in the outer casing of the fixture.

Our invention increases the light output from the optical fiber conduit by at least 200 percent, and eliminates the chromatic aberration produced by a conduit at the gate. In addition, it provides a less expensive assembly, and eliminates the need for having the conduit bent to an L-shape, as it would be when used at the gate. The rod in the device of the invention is merely a straight, optical glass rod encased with a metal sleeve and if necessary can be replaced from outside the device, because of its straightness and its being held by a set screw in the outer portion of the fixture. On the exterior end of the rod a flexible fiber conduit is attached to produce an optical probe for intracavital illumination.

BRIEF SUMMARY OF DRAWINGS

Other objects, features and advantages of the invention will be apparent from the following specification, taken in connection with the accompanying drawing, in which.

DESCRIPTION OF THE SPECIFIC EMBODIMENTS

Figure 1:
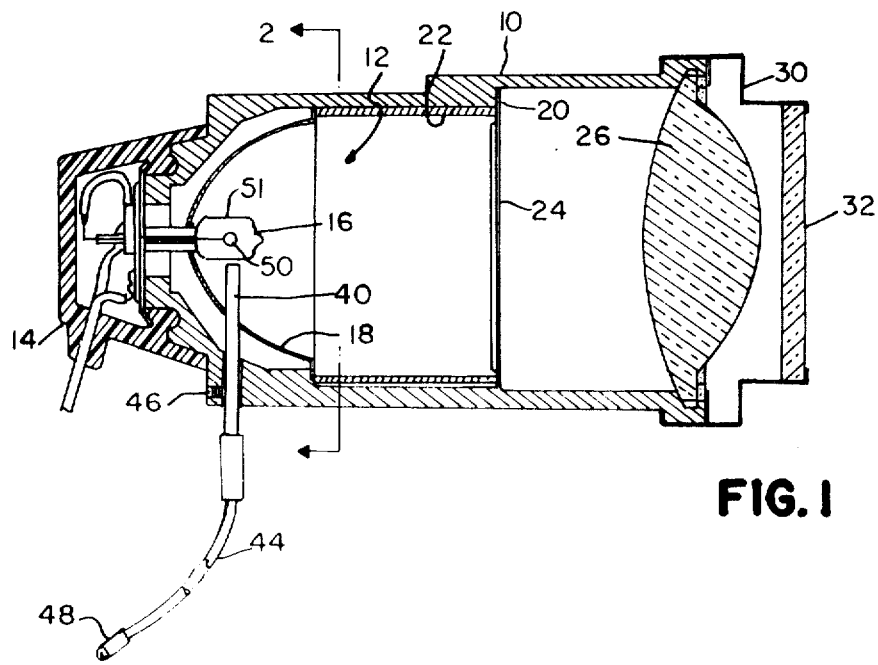
FIG. 1 is a longitudinal section of a device according to the invention.

Referring to FIG. 1, a cross sectional view of the medical and dental fixture is shown. The major components comprise a main housing canister 10, an optical system 12 located within the canister and a flexible boot 14 affixed to the rear end of the canister. The boot 14 covers and holds the electrical connections for a lamp 16. The lamp, being one of the components of the optical system of the fixture, is positioned within an ellipsoidal-shaped reflector 18. One focus of the reflector is positioned near the light source. The lamp and reflector produce an intense source whose light is directed through a rectangular opening 24 centrally located in a fixed light gate 20, which is positioned near the other focus of the reflector. A spacing rim 22 spaces the lamp and reflector from the light gate so that an optimum amount of light produced by the lamp 16 passes through the gate opening 24 and thence to an aspheric lens 26, and an exterior heat absorbing cover glass 32.

The lens 26 and heat absorbing cover glass 32 are spaced from one another and held by a circular bezel 30. This segment of the optical system produces a very sharply defined rectangular light pattern.

Figure 2:
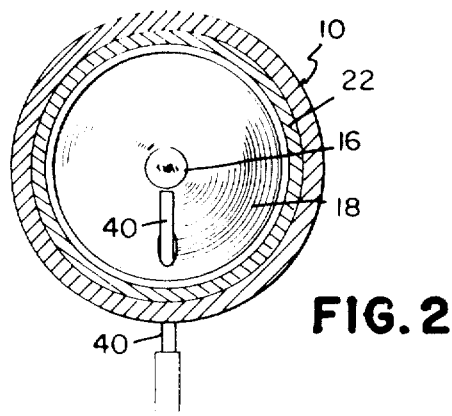
FIGS. 2 is a transverse section of the device in the plane 2—2 of FIG. 1.

The optically clad glass rod 40 shown in FIGS. 1 and 2 is made of a glass rod probe with optically polished ends and encased within a metal casing. One end of the rod 40 extends into the housing 10, and passes through the reflector and terminates just short of the envelope 51 of the lamp, and perpendicular to the axis of the filament 50. The other end of the rod 40 extends outwardly from the housing 10 and is connected to a flexible fiber optic conduit comprised of a standard bundle of flexible fibers 44 in shape of a conduit having an approximately cricular cross section.

With this arrangement the rod 40 collects from the filament light which travels over the conduit 44 to emerge at the light exit end 48.

Although a specific embodiment has been described above, that was by way of explanation and not limitation, and various modifications and alterations in the invention will be apparent to a worker skilled in the art from the above specification, the scope of the invention being limited only by the claims.

What we claim is:

1. A dental lighting fixture for projecting a light beam comprisnig:
   a lighting source having a coiled incandescent filament enclosed in a light transmitting envelope;
   an elliptical reflector having two foci;
   one being near said source of light;
   a light gate near the other focus to delineate the beam;
   a lens for projecting a beam from the light coming from said source through said gate;
   an optical clad glass rod in perpendicular relationship to the axis of said coiled filament, said glass rod is connected to a flexible fiber optic for producing a small spot of light to supplement the beam where desired.

2. The fixture of claim 8, in which the light source is a coiled incandescent filament enclosed in a light-transmitting bulb, and the optical clad glass rod is perpendicular to the axis of the coiled filament and with its light receiving end in close proximity to the outside surface of said bulb.

3. The fixture of claim 8, in which the fixture has an enclosing outer casing through which the optical glass rod extends and to which it is attached.

4. The fixture of claim 8, in which an optical fiber conduit is connected to the optical clad glass rod outside the canister of the fixture.

5. The fixture of claim 8, in which the portion of the optical conduit outside the fixture canister is flexible at least in part.

6. The fixture of claim 8, in which the optical clad glass rod extends through the reflector to reach the proximity of the bulb.

* * * * *